March 7, 1933.　　　H. L. MILLER　　　1,900,359
MILK WEIGHING APPARATUS
Filed Aug. 11, 1931　　　2 Sheets-Sheet 1

Inventor:
Harry L. Miller,
by Calvert Calvert
Att'ys.

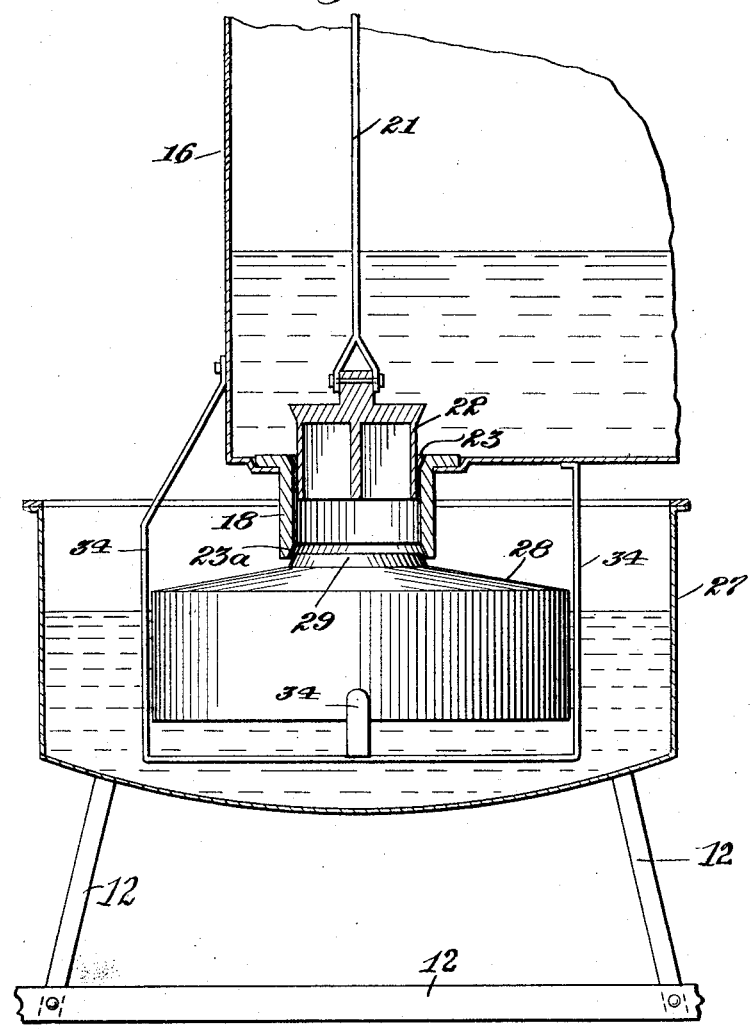

Patented Mar. 7, 1933

1,900,359

UNITED STATES PATENT OFFICE

HARRY L. MILLER, OF CHESTER, PENNSYLVANIA

MILK WEIGHING APPARATUS

Application filed August 11, 1931. Serial No. 556,444.

In creameries and cheese factories to which milk is supplied by farmers or producers it is necessary to weigh the milk to determine the quantity to be paid for. The weighing apparatus now generally in use comprises a weighing tank which rests on the platform of the weighing scale, and a receiving tank into which the milk from the weighing tank is discharged, the receiving tank being of somewhat greater capacity than the weighing tank so that all of the weighed milk in said weighing tank may be discharged at one time into the receiving tank. This apparatus, with such a large receiving tank, necessitates locating the weighing tank at such a height that the milk cans to be emptied into said weighing tank have to be lifted to an inconvenient height.

This invention has for its object to provide a milk weighing apparatus which is compact, so that it is convenient in use, and in the operation of which it will not be necessary to lift the milk cans to any inconvenient height. To this end the weighing tank is provided with an outlet having a manually controlled valve which may be opened when milk is to be discharged therefrom into the receiving tank placed below it. The outlet, in the present case, is in the form of a discharge tube, and the receiving tank contains a float the top of which is provided with a valve which will be lifted with said float so as to fit against a valve seat at the lower end of the discharge tube which is mounted on the weighing tank. When the amount of liquid accumulating in the receiving tank rises to a certain height, the float is lifted so as to close the discharge tube or outlet from the weighing tank, thus preventing overflow of the relatively small receiving tank. Connected with the receiving tank is a pump which forces the milk from the said tank through a pipe to any desired reservoir or receptacle for the milk. This constant pump discharge enables the use of a relatively small receiving tank and contributes to the compactness of the weighing apparatus.

Figure 1:
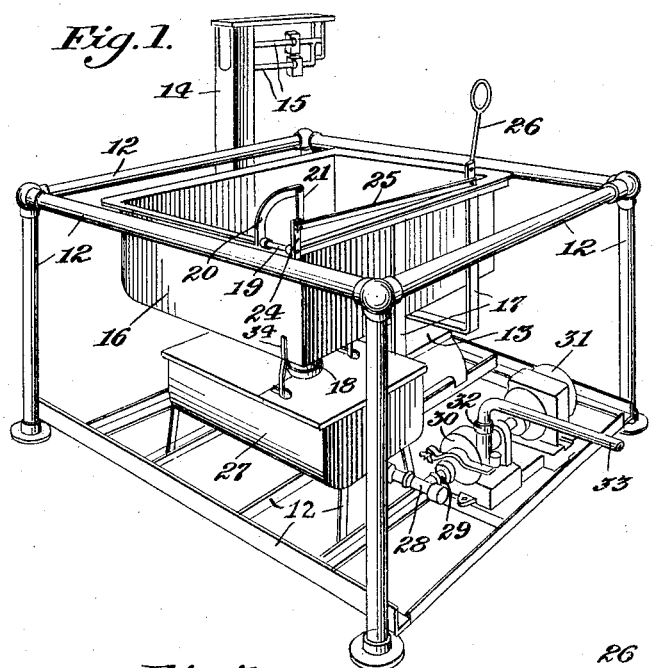
Figure 3:
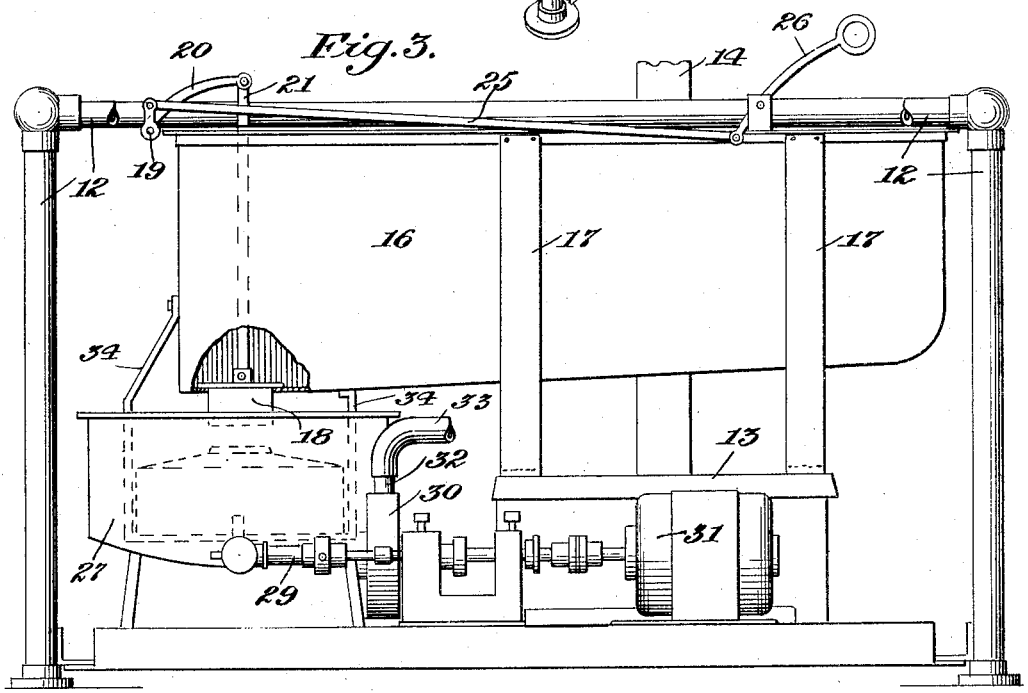

In the accompanying drawings Fig. 1 is a perspective view of the improved milk weighing apparatus. Fig. 2 is a sectional view of the receiving tank, this view showing also part of the weighing tank. Fig. 3 is a side view, partly broken away, of the improved apparatus.

Referring to the drawings, 12 denotes a framework comprising standards and connecting bars all of which may be of tubular construction. A platform scale is located within this framework and may be mounted on bars at the base thereof so as to be supported thereby. As shown in Fig. 1, 13 denotes a part of the platform of the scale, 14 the standard thereof and 15 the scale beams. The weighing tank 16 is provided with U-shaped bars 17 the bottoms of which rest on the platform of the scale.

The weighing tank 16 is provided with an outlet or discharge tube 18 having valve seats 23 and 23ª at its top and bottom, respectively. Mounted on the weighing tank 16 is a rock-shaft 19 having an upwardly extending curved arm 20 from which depends a bar 21 to the lower end of which is attached a valve 22 which, when lowered, will rest on the upper valve seat 23 of the outlet tube 18. The rock-shaft 19 has a second arm 24 which is connected by a bar 25 with the lower end of a hand lever 26 which may be operated to raise and lower the valve 22.

Located below the weighing tank 16 is a receiving tank 27 which contains a float 28 the top of which is provided with a valve 29 adapted, when the said float is lifted, to fit against the lower valve seat 23ª of the discharge tube 18.

Connected with the receiving tank 27, by pipes 28 and 29, is a pump 30 which may be driven by an electric motor 31. A pipe 33 may be connected with the discharge outlet 32 of the pump 30 and through which pipe the milk will be forced to any suitable reservoir or receiving vat.

In the operation of this milk weighing apparatus the milk to be weighed will be poured from the cans into the weighing tank 16, and after the weighing of the milk has been registered the valve 22 will be lifted manually so as to enable the milk in said tank to be discharged into the receiving tank 27. The pump 30 being now in operation the milk will be drawn from the said receiving tank, but should the liquid in the tank rise to a height which would endanger an overflow the float 28 will be lifted causing the valve 29 at the top of said float to close the lower end of the discharge or outlet tube 18. When, due to the operation of the pump, the liquid in the receiving tank falls low enough to lower the float 28, the lower end of the discharge tube will be opened and the discharge of the liquid from the weighing tank to the receiving tank will then be resumed.

Attached to the weighing tank 16 and extending down into the receiving tank 27 is a framework 34 in which the float 22 loosely fits, said framework serving to guide the said float in its vertical movement, and hold it in a proper position so that its valve 29 will register with the valve seat 23ª on the discharge tube 18. When the milk is poured into the weighing tank the valve 22 is, of course, closed, and after the milk is weighed the weight of the weighing tank, and the float and its guiding frame, as indicated by the tare beam of the scale, will be deducted from the gross weight to give the accurate net weight of the milk.

It is obvious, in the operation of applicant's device, that a weighing operation may be performed while the receiving tank 27 is being emptied by the pump, so that the work of weighing the milk may be carried on expeditiously.

From the foregoing it will be understood that, owing to the relatively small receiving tank which may be used in this improved apparatus, the weighing tank need not be of such a height as will necessitate inconvenient lifting of the milk cans when filling said weighing tank.

Having thus described my invention I claim and desire to secure by Letters Patent:

1. A milk weighing apparatus comprising a scale, a weighing tank carried thereby and provided at its bottom with an outlet tube having valve seats at its top and bottom, a manually-controlled valve fitting the upper valve seat on said tube and which, when resting on said valve seat, will close the outlet from said tank, a stationary receiving tank located below said weighing tank, a float in said receiving tank and a valve on said float fitting the lower valve seat on said tube.

2. A milk weighing apparatus comprising a platform scale, a weighing tank supported on the platform of said scale for vertical movements therewith and provided at its bottom with an outlet tube having valve seats at its top and bottom, a manually-controlled valve fitting the upper valve seat on said tube and which, when resting on said valve seat, will close the outlet from said tank, a stationary receiving tank located below said weighing tank, a float in said receiving tank and a valve on said float fitting the lower valve seat on said tube.

3. A milk weighing apparatus comprising a platform scale, a weighing tank supported on the platform of said scale for vertical movements therewith and provided at its bottom with an outlet tube having valve seats at its top and bottom, a manually-controlled valve fitting the upper valve seat on said tube and which, when resting on said valve seat, will close the outlet from said tank, a stationary receiving tank located below said weighing tank, a float in said receiving tank, a valve on said float fitting the lower valve seat on said tube and a guiding frame attached to said weighing tank enclosing said float to cause the valve on said float to register with said lower valve seat.

4. An apparatus for use in weighing milk comprising a weighing tank adapted to rest on the platform of a scale for vertical movement therewith and having a valve-controlled outlet; a stationary receiving tank located below and of less capacity than said weighing tank and a float in said receiving tank arranged to close the outlet from said weighing tank when said float is lifted to a predetermined height.

5. A milk weighing apparatus comprising a platform scale, a weighing tank supported on the platform of said scale for vertical movement therewith and having a valve-controlled outlet, a stationary receiving tank located below and of less capacity than said weighing tank, a float in said receiving tank and a valve on said float arranged to close the outlet from said weighing tank when said float is lifted to a predetermined height.

In testimony whereof I affix my signature.

HARRY L. MILLER.